US008953666B2

(12) United States Patent
Ebisu

(10) Patent No.: US 8,953,666 B2
(45) Date of Patent: Feb. 10, 2015

(54) RELAYING APPARATUS, AND COMMUNICATION SYSTEM

(71) Applicant: Panasonic Corporation, Osaka (JP)

(72) Inventor: Hiromitsu Ebisu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 12 days.

(21) Appl. No.: 13/910,604

(22) Filed: Jun. 5, 2013

(65) Prior Publication Data

US 2013/0335516 A1 Dec. 19, 2013

(30) Foreign Application Priority Data

Jun. 18, 2012 (JP) ................................ 2012-136607
May 1, 2013 (JP) ................................ 2013-096191

(51) Int. Cl.
| | | |
|---|---|---|
| H04B 17/00 | (2006.01) | |
| H04N 7/14 | (2006.01) | |
| H04M 15/00 | (2006.01) | |
| H04L 12/26 | (2006.01) | |
| H04L 12/917 | (2013.01) | |
| H04L 12/927 | (2013.01) | |
| H04L 12/911 | (2013.01) | |

(52) U.S. Cl.
CPC ............... *H04N 7/141* (2013.01); *H04M 15/00* (2013.01); *H04L 43/0876* (2013.01); *H04L 47/76* (2013.01); *H04L 47/808* (2013.01); *H04L 47/822* (2013.01)

USPC ............................................................ 375/224

(58) Field of Classification Search
USPC ................... 375/224; 455/450; 370/329, 338
See application file for complete search history.

(56) References Cited

U.S. PATENT DOCUMENTS

| | | | |
|---|---|---|---|
| 2005/0198355 A1 | 9/2005 | Kawada | |
| 2007/0098060 A1* | 5/2007 | Tanaka | 375/224 |
| 2007/0225040 A1* | 9/2007 | Kurose | 455/561 |
| 2009/0103504 A1* | 4/2009 | Inumaru | 370/338 |
| 2010/0015986 A1* | 1/2010 | Kono | 455/450 |
| 2011/0182261 A1* | 7/2011 | Tanaka | 370/329 |

FOREIGN PATENT DOCUMENTS

JP 2005-109744 A 4/2005

* cited by examiner

*Primary Examiner* — Mohammad Islam
(74) *Attorney, Agent, or Firm* — Renner, Otto, Boisselle & Sklar, LLP

(57) ABSTRACT

A control device according to an embodiment of the present disclosure controls communications between a plurality of information terminals at a first site and an information device at a second site. The control device includes: an interface that obtains class information indicating what class is allocated to each of those information terminals and also obtains rate information indicating a rate of communication with the information device over a network; and a control section that puts an upper limit on the communication rate of each of the information terminals by reference to the class information and the rate information and notifies the information terminal of the upper limit.

17 Claims, 16 Drawing Sheets

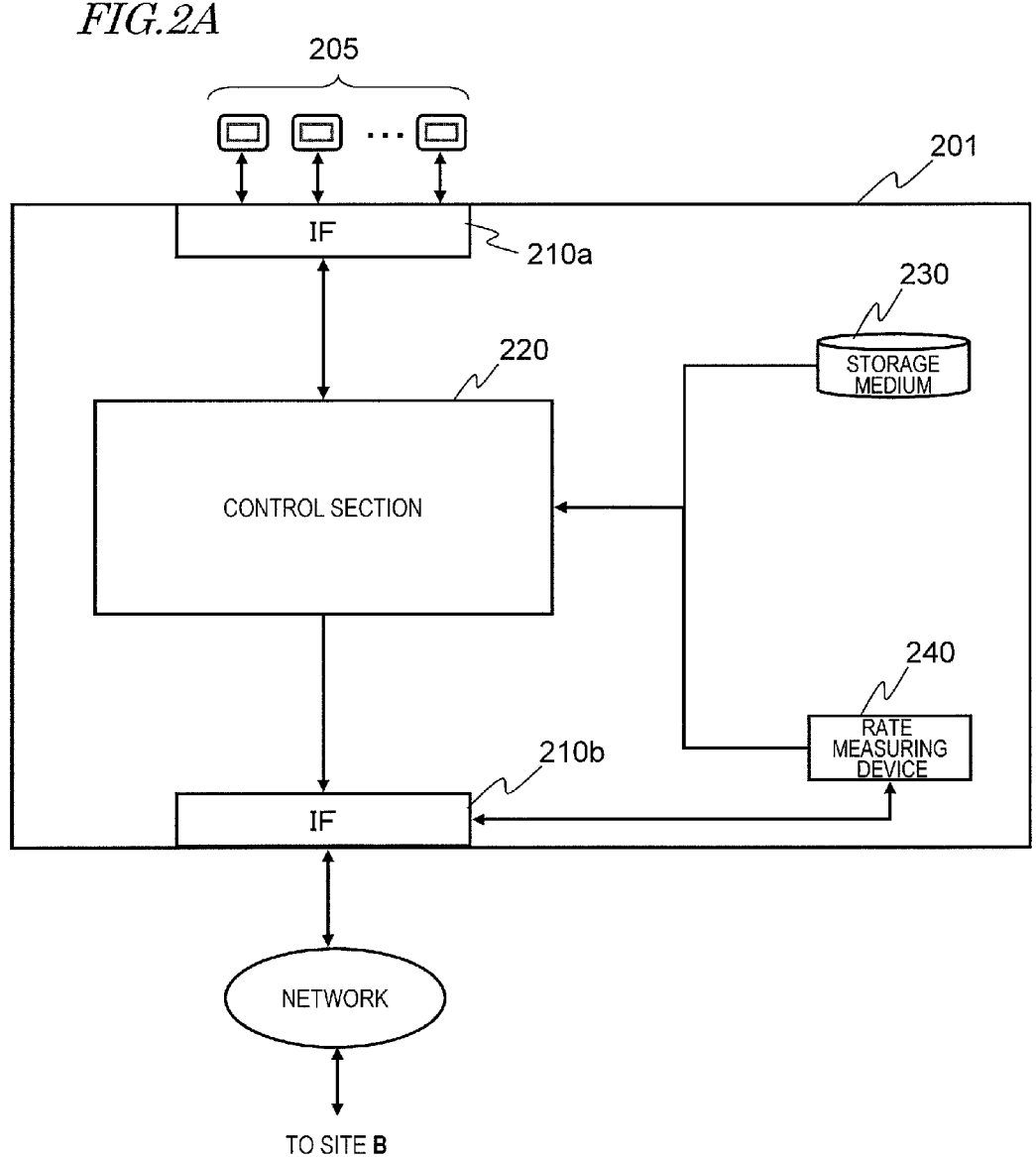

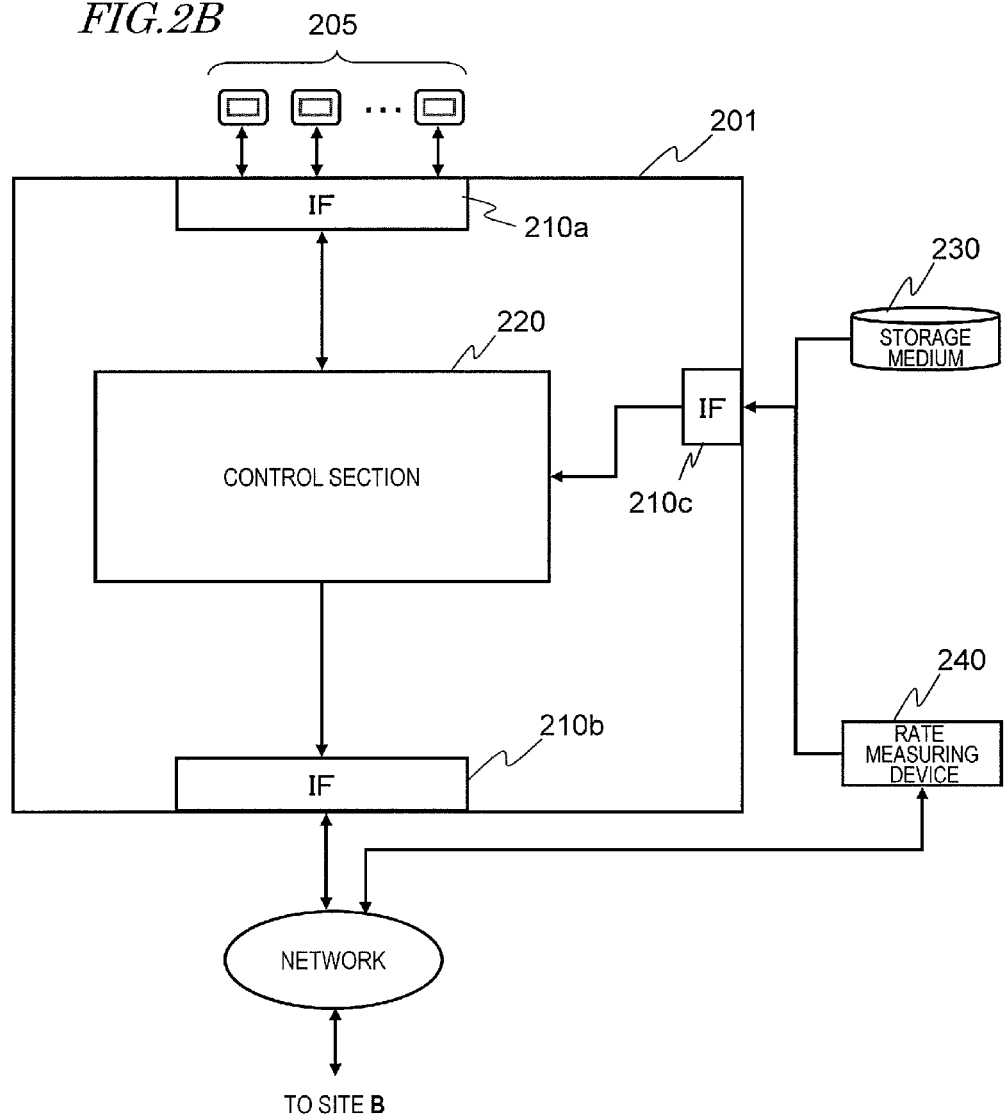

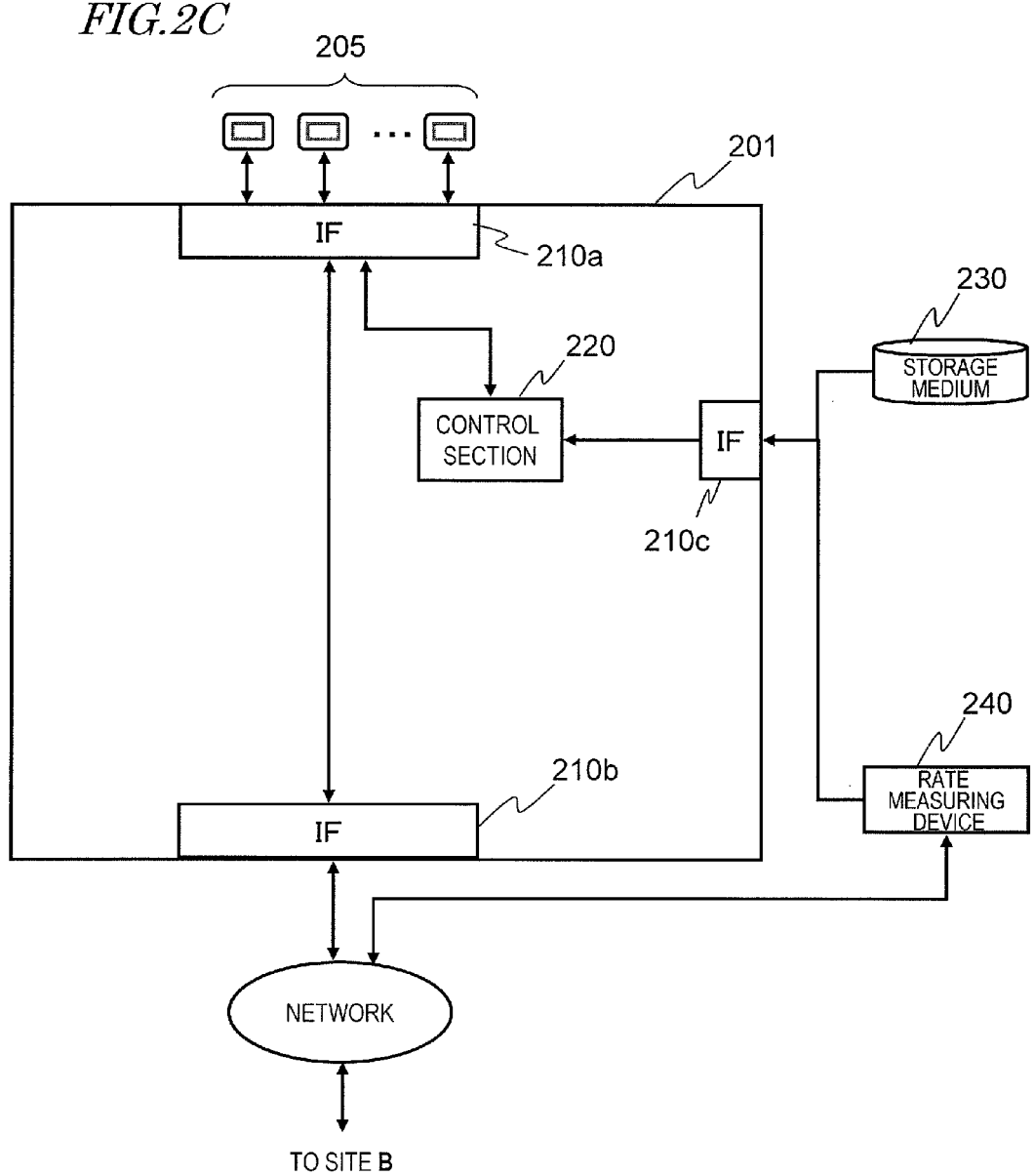

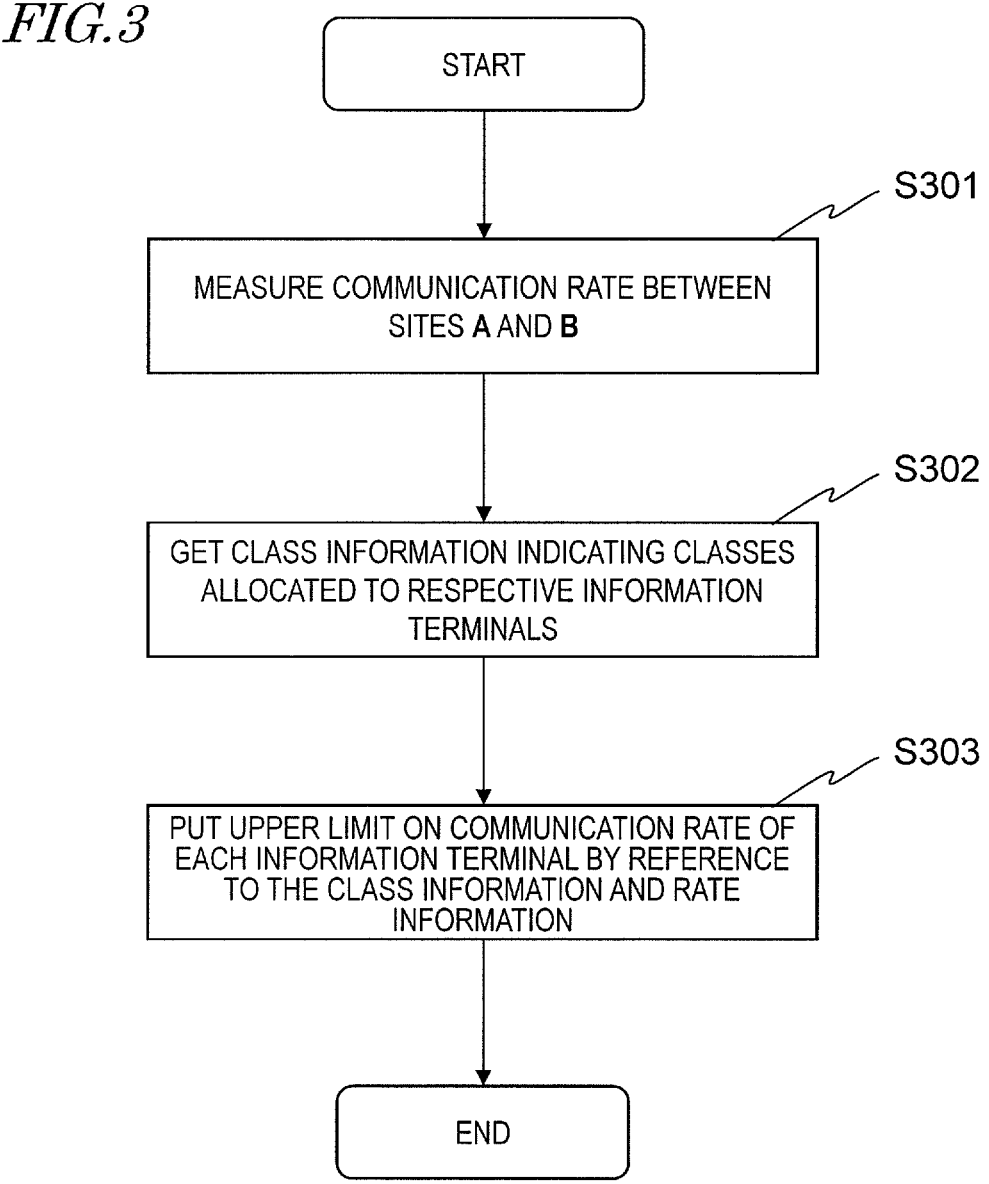

*FIG. 7*

| TERMINAL | CLASS | LOGGED IN? |
|---|---|---|
| 192.168.0.100 | HIGH RESOLUTION | Yes |
| 192.168.0.101 | HIGH RESOLUTION | Yes |
| 192.168.0.102 | MEDIUM RESOLUTION | No |
| 192.168.0.103 | LOW RESOLUTION | No |
| 192.168.0.104 | LOW RESOLUTION | Yes |
| ... | ... | ... |

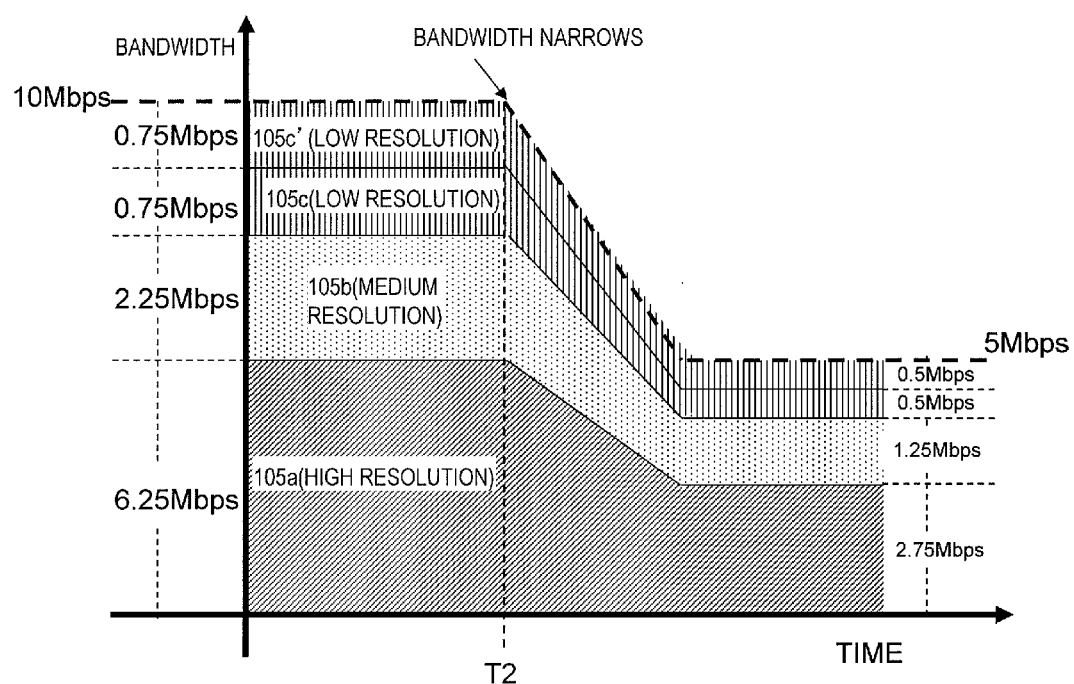

*FIG.12*

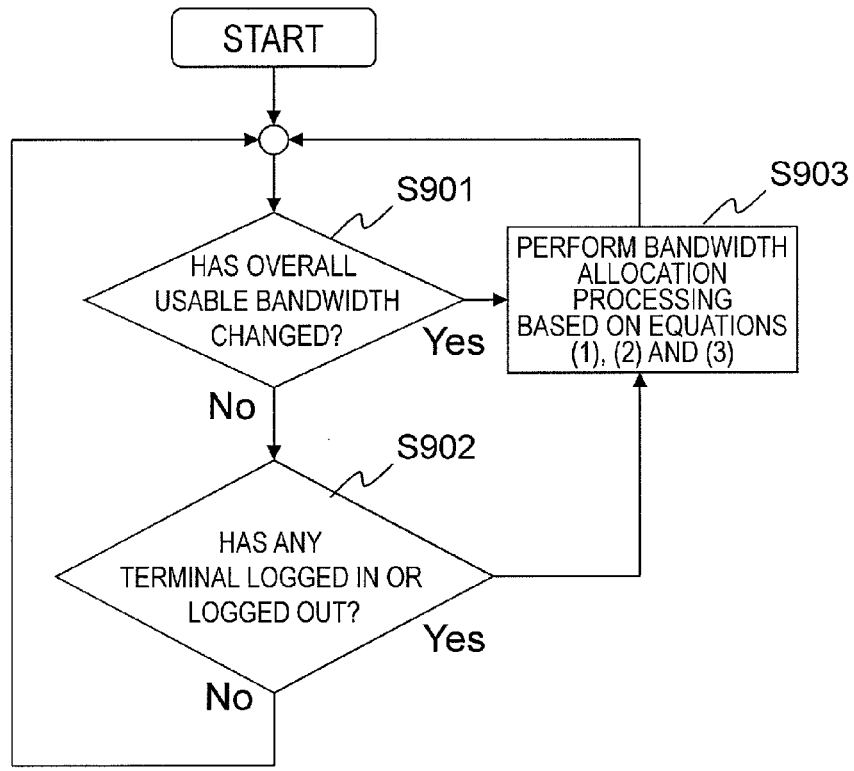

(1) $Fb = 6 \times Wb / (Fn \times 6 + Bn \times 3 + En \times 1)$
(2) $Bb = 3 \times Wb / (Fn \times 6 + Bn \times 3 + En \times 1)$
(3) $Eb = 1 \times Wb / (Fn \times 6 + Bn \times 3 + En \times 1)$ Fb: BANDWIDTH ALLOCATED TO EACH TERMINAL OF First Class
Bb: BANDWIDTH ALLOCATED TO EACH TERMINAL OF Business Class
Eb: BANDWIDTH ALLOCATED TO EACH TERMINAL OF Economy Class
Fn: NUMBER OF LOGGED-IN TERMINALS OF First Class
Bn: NUMBER OF LOGGED-IN TERMINALS OF Business Class
En: NUMBER OF LOGGED-IN TERMINALS OF Economy Class
Wb: OVERALL USABLE BANDWIDTH

RELAYING APPARATUS, AND COMMUNICATION SYSTEM

BACKGROUND

1. Technical Field

The present disclosure relates to a communications system that enables a plurality of sites, each including a plurality of terminals, to communicate with each other.

2. Description of the Related Art

Recently, video calling services that allow the user(s) of at least one video call terminal at one site to talk with the user(S) of at least one more video call terminal at a distant site have become more and more popular. According to these services, however, it is not that one video call terminal at one site and another video call terminal at another distant site are simply directly connected together, but communications are carried out between those sites via a plurality of routers that each of those sites has.

For example, services that allow a passenger using a video call terminal at a seat of an airplane to have a video talk with someone using a video call terminal on the ground via a plurality of routers, a plurality of antennas installed on the airplane and on the ground, and a communications satellite have just started to be provided.

In such inter-site video calling services, only a limited bandwidth (or communications rate) is available for each site, and therefore, it is important to perform a bandwidth control according to the status of an ongoing video call. The bandwidth control is important in not only such video calling services but also any other form of service that requires to transmit data of a huge size.

Japanese Laid-Open Patent Publication No. 2005-109744 discloses an exemplary bandwidth control method. In the CATV system disclosed in FIG. 4 of Japanese Laid-Open Patent Publication No. 2005-109744, a cable modem CM can change the frequency ranges that are currently used by personal computers PC1 and PC3 connected to the modem following a predefined condition.

In one embodiment of Japanese Laid-Open Patent Publication No. 2005-109744, by setting the condition on the number of personal computers connected, if only a few persons are using those personal computers, the bandwidth available for each of them can be broadened. And even if the number of persons using the computers has increased, the bandwidth available for each of them just needs to be narrowed. Thus, optimum bandwidth setting can be made according to the number of personal computers connected.

SUMMARY

A non-limited exemplary embodiment of the present disclosure provides a communications system that realizes a more suitable bandwidth control.

A control device according to a general aspect of the present disclosure controls communications between a plurality of information terminals at a first site and an information device at a second site. A selected one of multiple classes is allocated to each of the plurality of information terminals and those multiple classes are associated with respective levels of communication rates. The control device includes: an interface configured to obtain class information indicating what class is allocated to each of those information terminals and also obtain rate information indicating a rate of communication with the information device over a network; and a control section configured to set an upper limit on the communication rate of each of the information terminals by reference to the class information and the rate information and notify the information terminal of the upper limit.

According to that aspect of the present disclosure, by reference to the class allocated to each information terminal, the communication rate per information terminal can be calculated and allocated. Consequently, more appropriate services can be provided according to the status of communications and the class of the information terminal.

This general and particular aspect can be implemented as a system, a method, a computer program or a combination thereof.

Other benefits and advantages of an embodiment disclosed herein will become apparent from the following description and attached drawings. Those benefits and/or advantages can be provided individually by the matter that is disclosed in the description and drawings. It should be noted, however, that not everything needs to be provided to achieve one or two or more similar ones of those benefits and advantages.

BRIEF DESCRIPTION OF THE DRAWINGS

FIG. 2A illustrates an exemplary general configuration for a router.

FIG. 2B illustrates another exemplary general configuration for a router.

FIG. 2C illustrates still another exemplary general configuration for a router.

FIG. 3 is a flowchart showing generally how the router performs its processing.

FIG. 7 shows an exemplary set of class information.

FIG. 11 is a graph showing how the bandwidths allocated to respective video call terminals change with time in a situation where while the high-resolution video call terminal 105a, the medium-resolution video call terminal 105b and the two low-resolution video call terminals 105c and 105c' are having a video call, the usable bandwidth for the overall video call becomes narrower at a time T2.

FIG. 12 is a flowchart showing an exemplary bandwidth control to be performed by the router 101a.

DETAILED DESCRIPTION

Hereinafter, embodiments will be described with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Hereinafter, embodiments of the present disclosure will be described with reference to the accompanying drawings. Before specific embodiments are described, however, it will be outlined with reference to FIGS. 1 through 3 generally how this embodiment works.

Figure 1:
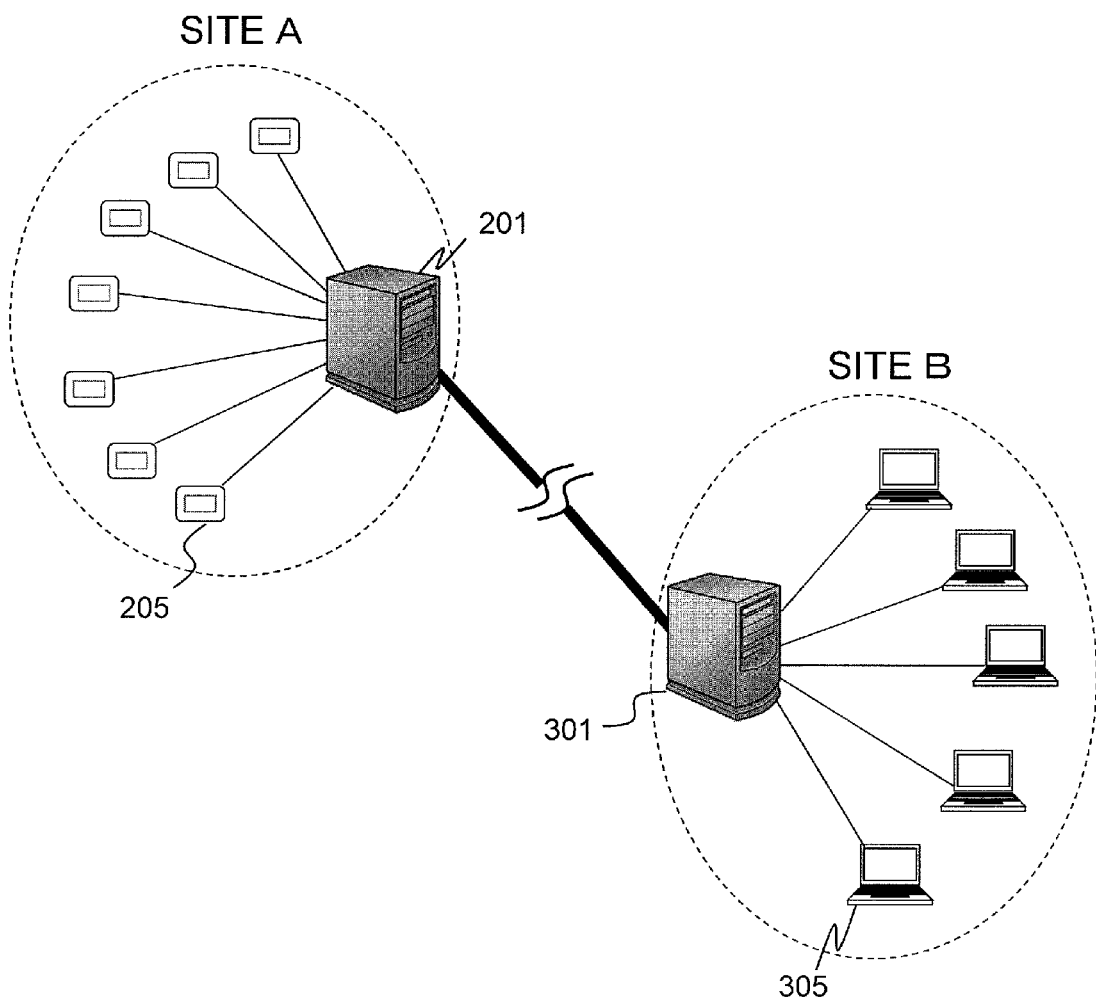
FIG. 1 illustrates an exemplary configuration for a communications system to make communications between two sites, each having a plurality of information terminals.

FIG. 1 schematically illustrates an exemplary communications system. In the communications system shown in FIG. 1, a plurality of information terminals 205 and a router (or control device) 201 are provided at Site A, while a plurality of information devices 305 and another router (or control device) are provided at Site B. Communications are carried out between the information terminals 205 at Site A and the information devices 305 at Site B via the routers 201 and 301. These Sites A and B are connected together via some kind of network such as the Internet, a dedicated line, a VPN (virtual private network) or a LAN (local area network). In the example illustrated in FIG. 1, seven information terminals 205 are installed at Site A and five information devices are installed at Site B. However, this is only an example and any other number of information terminals 205 or information devices 305 may be provided as well. Also, in the example illustrated in FIG. 1, the information terminals 205 at Site A are mobile telecommunications devices such as tablet terminals, while the information devices 305 at Site B are personal computers (PCs). Nevertheless, any other type of telecommunications devices may also be used as the information terminals 205 or the information devices 305.

A selected one of multiple classes which are associated with respective levels of communications rates has been allocated in advance to each of these information terminals 205. For example, if Site A is an environment in which seats are classified into multiple zones as in an airplane, one of the three classes respectively corresponding to First Class, Business Class and Economy Class may be allocated to each information terminal 205. As long as there are at least two classes, any other number of classes may be provided as well. The router 201 performs a bandwidth control according to the class allocated to each information terminal 205.

FIG. 2A is a block diagram illustrating a general configuration for the router 201. In this example, the router 201 includes an interface (IF) 210a which transmits and receives information to/from those information terminals 205, another interface (IF) 210b which transmits and receives information to/from the router 301 at Site B over a network, a storage medium 230 which stores information indicating the classes allocated to those information terminals 205 (which will be sometimes referred to herein as "class information"), a rate measuring device 240 which measures the communication rate between Sites A and B and which outputs it as "rate information", and a control section 220 which puts an upper limit on the communication rate of each information terminal 205 by reference to the class information and the rate information. The control section 220 notifies each information terminal 205 of the upper limit that has been put on its communication rate. In response to the notification, each terminal can transmit video data after having changed the size of the video data into the best one within the communication bandwidth allocated to itself by either increasing or decreasing the resolution of that video data to transmit, for example. The data that has been received from each terminal is relayed by the control section 220 to an external network through the interface 210b. In this sense, it can be said that the control section 220 functions as a "relaying section". Thanks to these functions of the control section 220, the bandwidth can be controlled appropriately according to the communication rate between Sites A and B and the classes of the respective terminals.

The storage medium 230 and the rate measuring device 240 are supposed to be provided in the router 201 in the example illustrated in FIG. 2A but may also be provided outside of the router 201. FIG. 2B is a block diagram illustrating an exemplary configuration to be used in such a situation. In the example shown in FIG. 2B, the router 201 further includes another interface 210c which gets the class information and the rate information from the storage medium 230 and the rate measuring device 240, respectively. By reference to the class information and the rate information that have been gotten through the interface 210c, the control section 220 puts an upper limit on the communication rate of each information terminal 205 and notifies the terminal of that upper limit.

FIG. 2C illustrates still another exemplary configuration for the router 201. In the example illustrated in FIG. 2C, the control section 220 does not have the data relaying function, and the data that has been received from the terminals is sent out to an external network via the two interfaces 210a and 210b. Although not shown in FIG. 2C, the data may also be relayed via a processor that performs either routing processing or scheduling processing. In such an example, a functional section contributing to the overall relaying processing, including the two interfaces 210a and 210b, can be called a "relaying section".

Figure 2D:
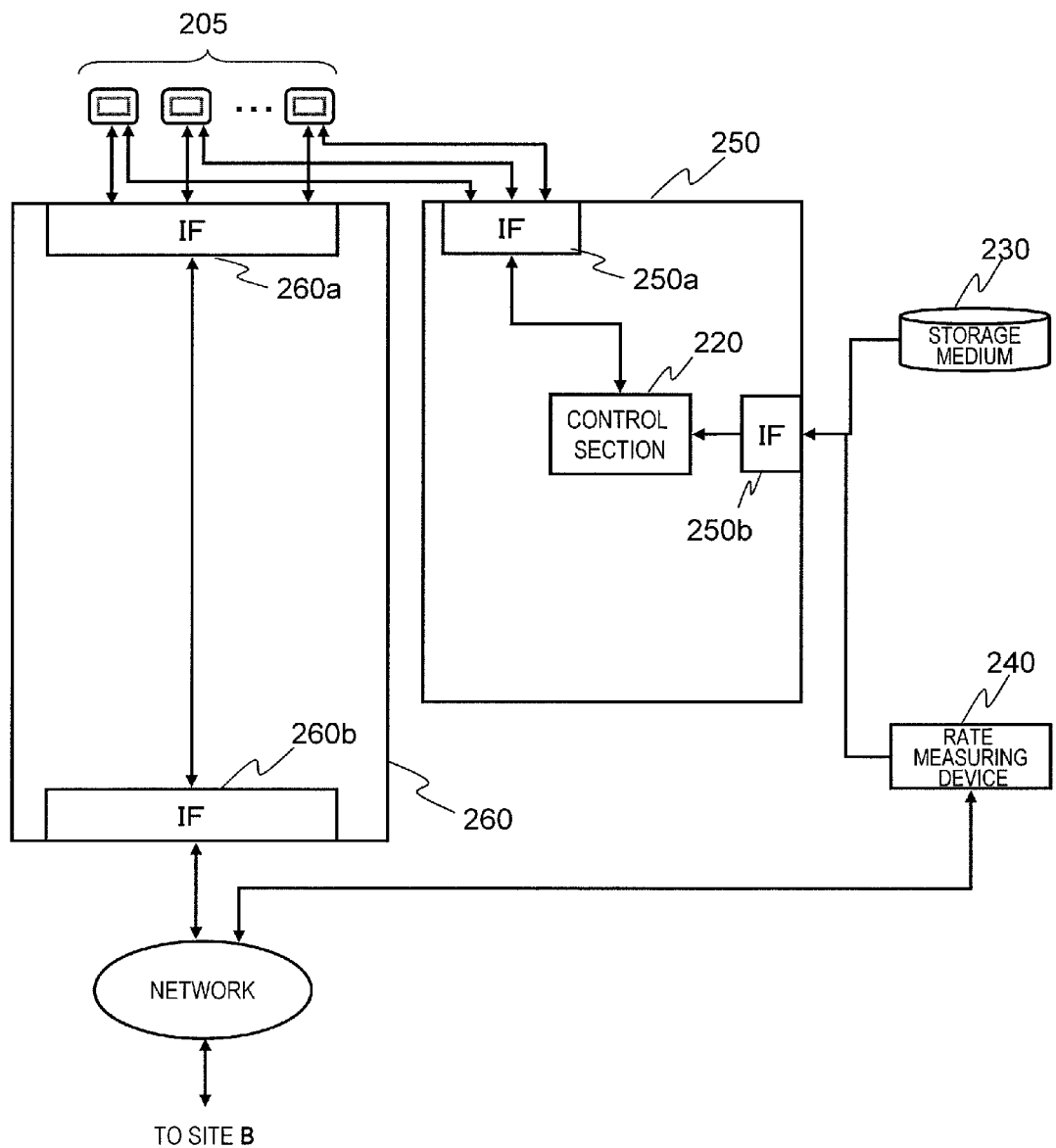
FIG. 2D illustrates yet another exemplary general configuration for a router.

FIG. 2D illustrates yet another exemplary configuration. In this example, a router 260 which relays the data and a control device 250 which performs a bandwidth control on the data are separately provided. The control device 250 includes a control section 220 which puts an upper limit on the communication rate of those information terminals 205 by reference to the class information and the rate information, an interface 250a which transmits and receives information to/from those information terminals 205, and another interface 250b which gets the class information and the rate information from the storage medium 230 and the rate measuring device 240, respectively. On the other hand, the router 260 includes an interface 250a which transmits and receives information to/from those information terminals 205, and another interface 260b which transmits and receives information to/from a router 301 at Site B over a network. Such a configuration in which the control device 250 and the router 260 are separated from each other may also be adopted.

FIG. 3 is a flowchart showing generally how the communications system described above performs its bandwidth control operation. First of all, before starting communications, the rate measuring device 240 measures in Step S301 the communication rate between Sites A and B. Specifically, the communication rate may be measured by transmitting test data of a predetermined size to the router 301, measuring the amount of time it has taken for a response to come back from the router 301, and making a calculation based on the amount of time measured and the size of the data transmitted. Next, in Step S302, the control section 220 gets information that indicates the classes allocated to the respective information terminals 205 from the storage medium 230. Optionally, this processing step S302 may be performed before the processing step S301. Subsequently, in Step S303, the control section 220 puts an upper limit on the communication rate of each information terminal 205 by reference to the class information and rate information that have been gotten. And the control section 220 controls the communications bandwidth that can be used by each information terminal 205 according to the upper limit that has been put on the communication rate.

By performing these processing steps, the bandwidth control can get done appropriately according to the communication rate of the network and the class of each terminal. That is to say, the higher the communication rate associated with the class of the terminal that has provided the data, the larger the size of the data to be sent out to the network. According to such a configuration, even if either the communication rate of the network between Sites A and B or the number of information terminals 205 that are all set to start communications has varied, the control section 220 can also set the best communication rate for each information terminal 205 by reference to the real time rate information and the class information. Particularly if the seats are classified into multiple zones as in an airplane, the bandwidth control can get done dynamically according to the varying communications environment with a relatively high communication rate secured for information terminals that are installed in First Class seats and with a relatively low communication rate secured for information terminals that are installed in Economy Class seats.

Hereinafter, more specific embodiments of the present disclosure will be described.

EMBODIMENTS

1-1. Configuration

Figure 4A:
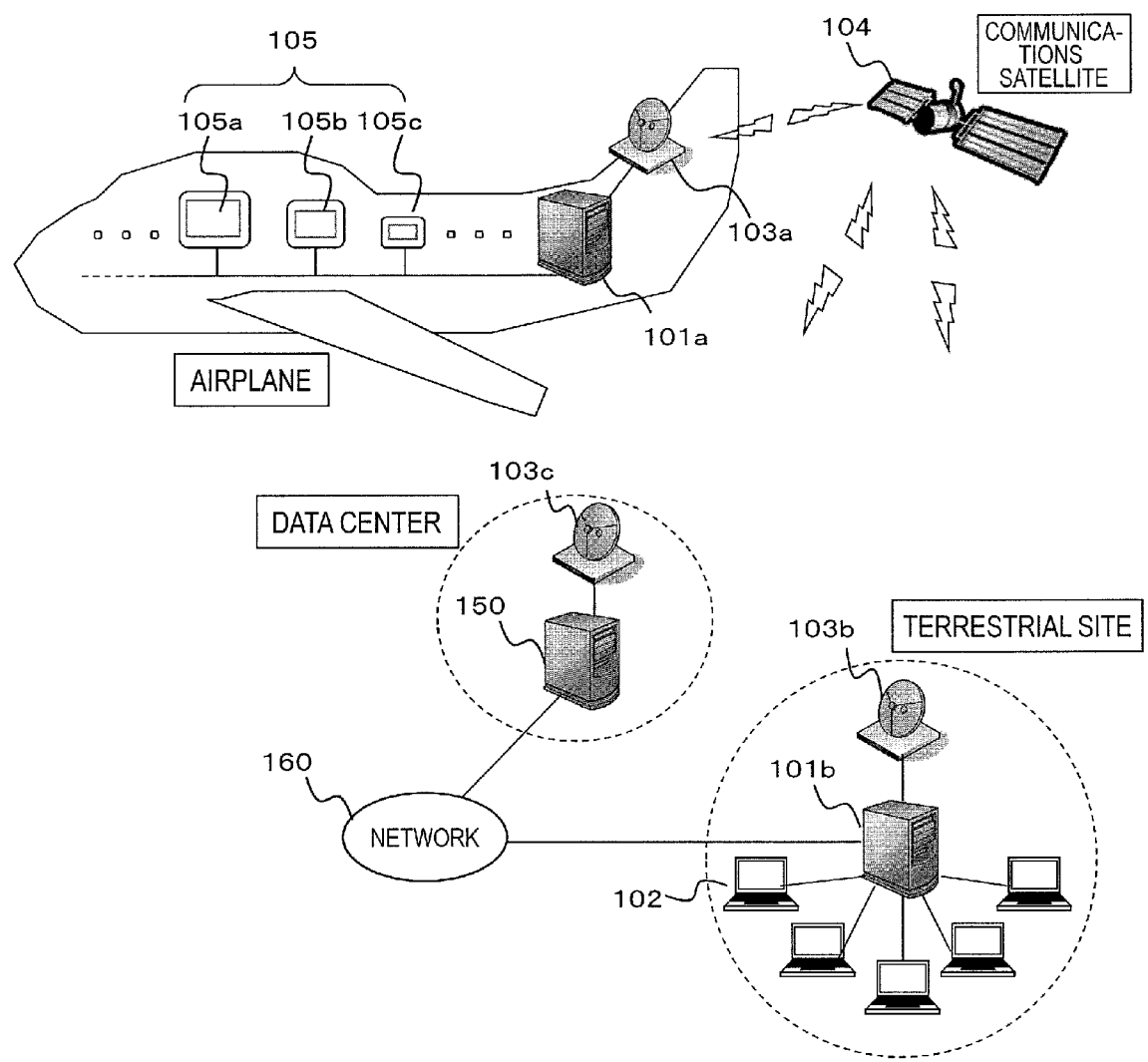
FIG. 4A illustrates an exemplary configuration for an airplane-terrestrial site communications system via communications satellite.

FIG. 4A schematically illustrates a configuration for a video calling system according to an embodiment of the present disclosure. This video calling system includes a plurality of video call terminals 105 on passenger seats, a router 101a, and a wireless antenna 103a which are installed in an airplane, a plurality of video call terminals 102, a router 101b and a wireless antenna 103b which are installed at a terrestrial site, and a communications satellite 104 which relays communications between the airplane and the terrestrial site. This video calling system further includes a video call server 150 and a communications satellite 103c which are installed in a terrestrial data center. The terrestrial site and the video call server 150 in the data center are connected together via a network 160. The video call server 150 can also communicate with the router 101a in the airplane via the wireless antenna 103c.

Those video call terminals 105 installed in the airplane are classified into three groups according to the classes of their seats. Specifically, the video call terminals 105 are classified into a group of video call terminals 105a on First Class seats, a group of video call terminals 105b on Business Class seats, and a group of video call terminals 105c on Economy Class seats. Each video call terminal 105a has a monitor screen with the highest resolution, each video call terminal 105b has a monitor screen with a medium resolution, and each video call terminal 105c has a monitor screen with the lowest resolution. The router 101a is connected to all video call terminals 105 and the wireless antenna 103a either via cables or wirelessly, and relays communications by those video call terminals 105. The wireless antenna 103a carries out wireless communications with the communications satellite 104 outside of the airplane. The communications satellite 104 relays communications between the airplane and the terrestrial site.

Those video call terminals 102 at the terrestrial site are computers which allow the user to have a video call. The router 101 is connected to all video call terminals 102 and the wireless antenna 103b at the terrestrial site either via cables or wirelessly, and relays communications by those video call terminals. 102. The wireless antenna 103b carries out wireless communications with the communications satellite 104.

The video call server 150 at the terrestrial data center is a server computer which provides video call services between the video call terminals 150 in the airplane and the video call terminals 102 at the terrestrial site. The video call server 150 carries out terminal authentication or user log in authentication with respect to the video call terminals 105 in the airplane and the video call terminals 102 at the terrestrial site and provides video call services for those terminals. For that purpose, the server 150 is connected to a router (not shown) so as to communicate with the router 101a in the airplane via the wireless antenna 103c and also communicate with the router 101b at the terrestrial site over the network 160.

Figure 4B:
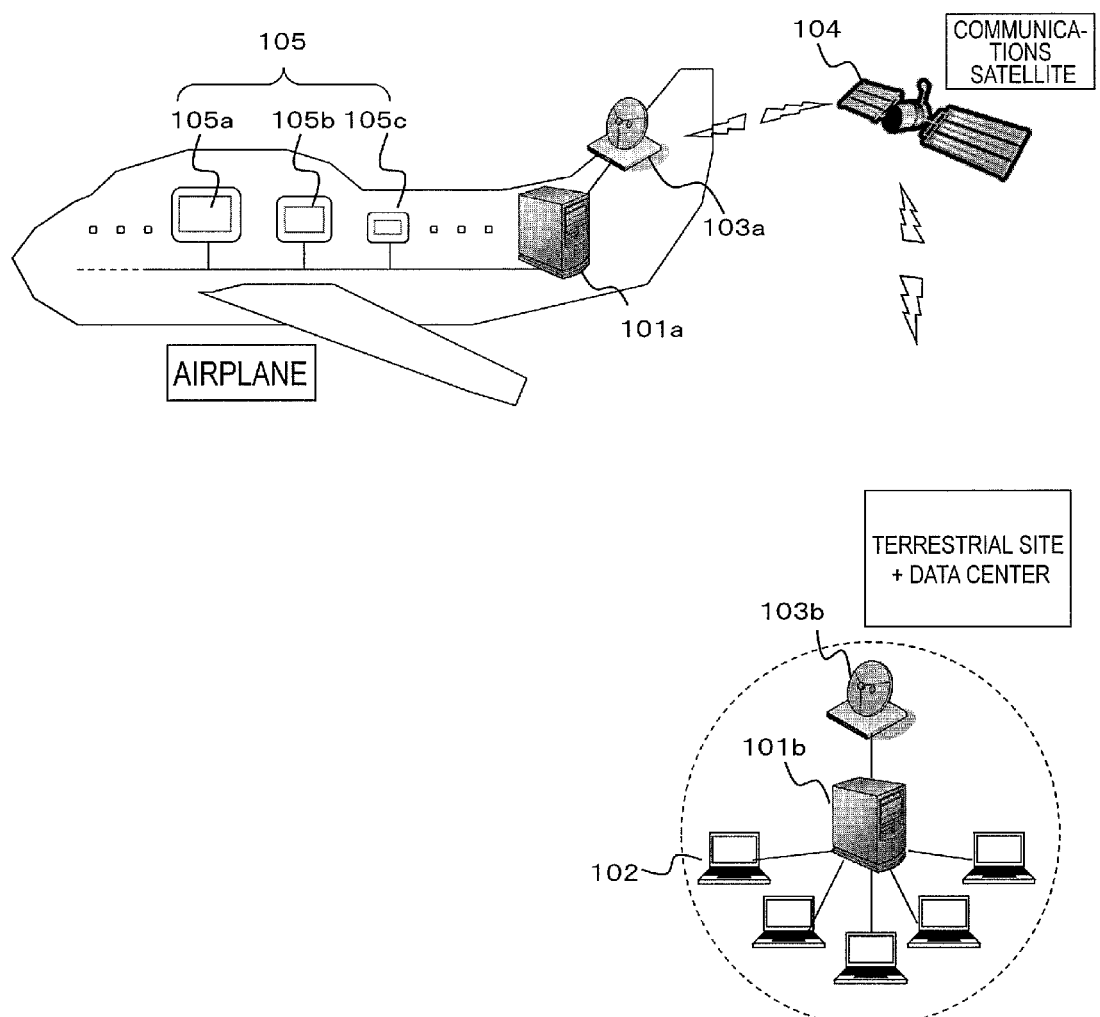
FIG. 4B illustrates another exemplary configuration for an airplane-terrestrial site communications system via communications satellite.

In this embodiment, the video call server 150 installed in the data center is supposed to be used as shown in FIG. 4A. However, this is only an example of the present disclosure. Alternatively, the terrestrial site and the data center may also be integrated together as shown in FIG. 4B. In that case, the router 101b also functions as the video call server 150. That is to say, the router 101b carries out every terminal's log in management, communication data size management, and communications with the satellite all by itself when such a configuration is adopted.

In this embodiment, every video call terminal 105, 102 is given a unique IP address and communications are carried out in accordance with the TCP/IP protocol. The transmission format of video data and audio data to be used in this embodiment is MPEG2-TS defined by ISO/IEC 13818-1. The network for use to make communications between the video call terminals, routers and wireless antennas in the airplane and at the terrestrial site is the Ethernet™ defined by the IEEE 802.3 standard. To make wireless communications between the wireless antenna 103a, 103b and the communications satellite 104, "Ku band" which is a frequency range of 12 to 18 GHz is used. However, this is just an example of the present disclosure and any other known communication and transmission method may be adopted as well. In the example to be described below, the video call terminals 105 are supposed to be classified according to their monitor screen resolution, which represents an exemplary environment in which those terminals are used.

Figure 5:
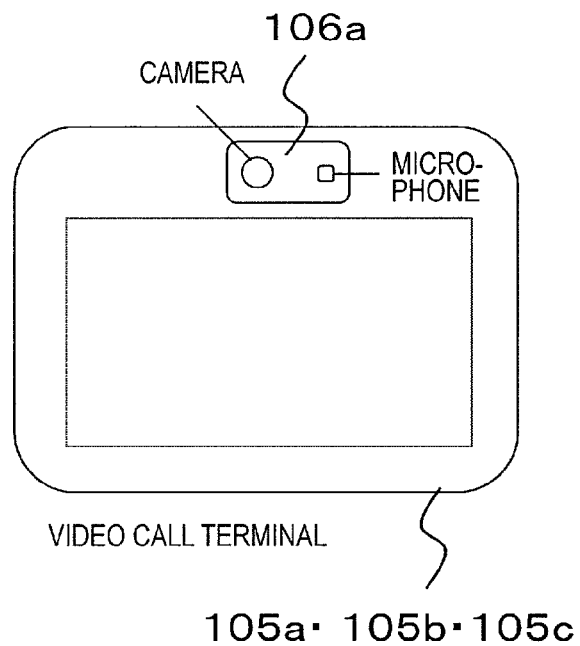
FIG. 5 is an enlarged view of a video call terminal 105 with microphone.
Figure 6:
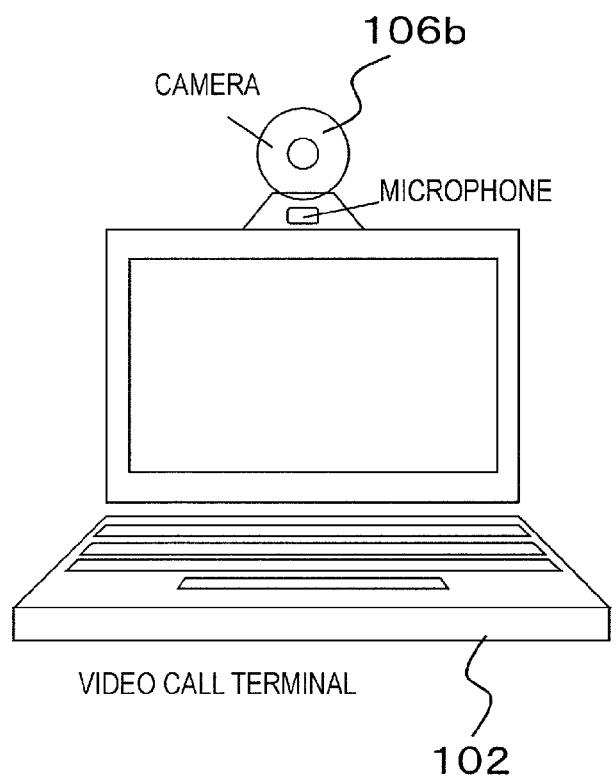
FIG. 6 is an enlarged view of a video call terminal 102 with microphone.

FIGS. 5 and 6 illustrate the video call terminals 105 and 102, respectively, on a larger scale. The video call terminal 105 includes a camera 106a with a built-in microphone, and the video call terminal 102 also includes a camera 106b with a built-in microphone. The video call terminals 105 and 102 transmit information such as video or a still picture that has been shot to the routers 101a and 101b, respectively, over the network. Furthermore, the video call terminals 105 and 102 display, on their monitor screen, video that has been received over the network. Video call software has already been installed in the video call terminals 105 and 102. By logging in a dedicated website using that software, the user can have a video call.

The router 101a of this embodiment has the same configuration as the one shown in FIG. 2A. That is to say, the router 101a includes an interface (IF) 210a which is electrically connected to each video call terminal 105, another interface (IF) 210b which is electrically connected to the wireless antenna 103a, a storage medium 230 which stores information indicating the classes allocated to those video call terminals 105 (which will be sometimes referred to herein as "class information"), a rate measuring device 240 which measures the communication rate between the airplane and the terrestrial site and which outputs it as "rate information", and a control section 220 which puts an upper limit on the communication rate of each video call terminal 105 by reference to the class information and the rate information.

The interfaces 210a and 210b may be Ethernet interfaces, for example, and each have a plurality of input/output ports to which an Ethernet cable can be connected. The storage medium 230 is a memory such as a DRAM or an SRAM and stores the class information. The rate measuring device 240 is a circuit which measures the rate of communication with the terrestrial site.

FIG. 7 shows an example of the class information to be stored on the storage medium 230. In this example, a table of the IP addresses of the respective terminals, their classes according to the monitor screen resolution, and their log in states is managed as the class information. However, this table is only an example of the present disclosure. Alternatively, a table which has no log in state items but which manages information about only logged in terminals may also be used.

The control section 220 is suitably implemented as a combination of an integrated circuit including a CPU (central processing unit) and a memory and various kinds of control programs to be executed by the CPU. Alternatively, the control section 220 may be comprised of only dedicated hardware components, too. The control section 220 has a bandwidth controlling function which determines the communication rate allocated to each video call terminal 105 by reference to the class information and the rate information provided by the storage medium 130 and the rate measuring device 140, respectively, and which notifies the video call terminal 105 of that communication rate.

Besides the elements shown in FIG. 2B, the router 101a may further include a power supply mechanism, a functional section which performs routing processing, a hard disk which stores information, and other elements as well. The router 101a does not have to have the configuration shown in FIG. 2B but may also have the configuration shown in FIG. 2C or 2D. If the configuration shown in FIG. 2D is adopted, the router 101a just needs to perform data relaying processing and the bandwidth control may be carried out by the control device 250 provided separately.

The terrestrial router 101b, on the other hand, may have the same configuration as the router 101a in the airplane, but may be implemented as a general-purpose router as well. That is to say, the bandwidth control function of this embodiment may be carried out only by the router 101a in the airplane and does not have to be carried out by the terrestrial router 101b.

1-2. Operation

Next, it will be described exactly how the video calling system of this embodiment carries out its processing.

Figure 8:
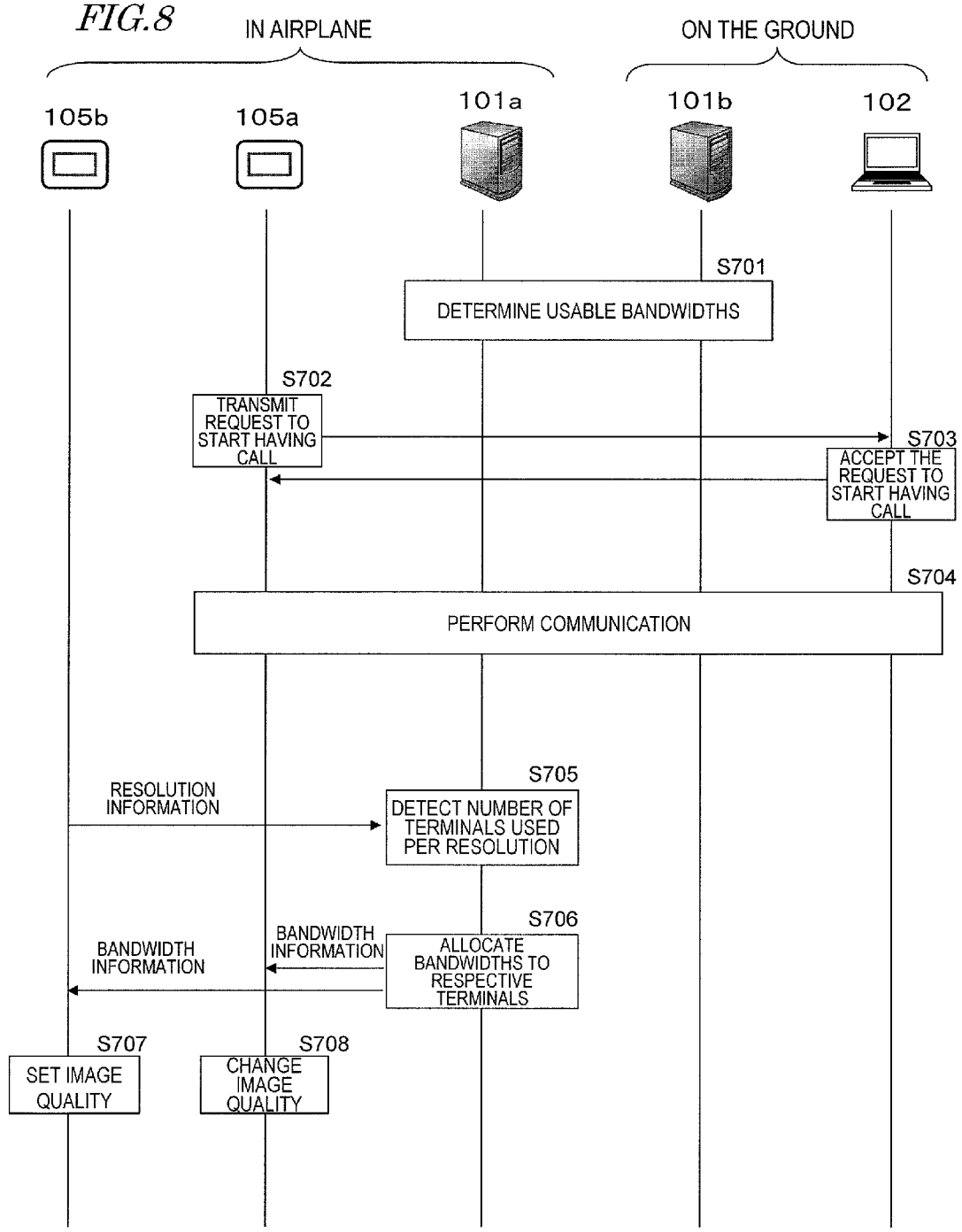
FIG. 8 shows an exemplary overall flow of communications.

FIG. 8 shows the overall flow of this video calling system's operation. First of all, in Step S701, before starting having a video call, the routers 101a and 101b communicate with each other, thereby determining their own usable bandwidth (communication rate) with respect to the communications satellite 104. The usable bandwidth may be determined by the size and transmission time of the rate measuring data to be transmitted from one of the two routers 101a and 101b to the other. In the router 101a, the rate measuring device 140 is in charge of this operation. The communication rate measured represents the usable bandwidth for the overall video call.

The video call is ready to be started by making one of the video call terminals 105 in the airplane and one of the terrestrial video call terminals 102 start video call software and log in on the video call services provided by the video call server 150 at the data center. After the video call terminals 105 and 102 at both sites have logged in, either one of the video call terminals 105a through 105c in the airplane or one of the terrestrial video call terminals 102 transmits data representing a request to start having a call to the video call terminal at the other site, and the video call terminal that has received the request to start having a call accepts that request, thereby starting having a call. In this example, the video call terminal 105a in the airplane is supposed to transmit a request to start having a call in Step S702 and the terrestrial video call terminal 102b is supposed to accept the request in Step S703. However, a similar operation may be carried out in the other way around. As a result, a video call is started in Step S704.

When the video call terminal 105a in the airplane and the terrestrial video call terminal 102b start having a video call, the cameras 106a and 106b with a microphone built in those video call terminals capture video and record audio. Then, those video call terminals encode the video and audio data thus obtained, convert the data into the MPEG2-TS format, and then send out the data to the network. When transmitted from the airplane onto the ground, the video and audio data that have been sent out is delivered to the video call terminal 102b via the router 101a, wireless antenna 103a, communications satellite 104; wireless antenna 103b and router 101b and played back there. On the other hand, when transmitted from the ground to the airplane, the video and audio data go through the other way around to be delivered to, and played back at, the video call terminal 105a.

If only one pair of terminals is having a video call, there is no limit to the usable bandwidth as long as the call is carried out within the "usable bandwidth for the overall video call". However, if another terminal is going to newly start having a video call while one or more pairs of terminals are already having a video call, the bandwidth control needs to be carried out appropriately. That is to say, in order to allocate a bandwidth to that terminal that is going to newly start having a video call while securing a bandwidth to those terminals that are already having a video call, the usable bandwidth per pair of video call terminals needs to be determined appropriately.

In the system disclosed in Japanese Laid-Open Patent Publication No. 2005-109744 cited above, when a limited bandwidth should be used by a plurality of terminals, the bandwidth control seems to be carried out by a method in which the "usable bandwidth per video call terminal" is obtained by dividing the "usable bandwidth for the overall video call" by the "number of video call terminals being used". According to such a method, however, an equal bandwidth will be allocated to each and every one of the video call terminals being used. That is why if the resolution of the video call terminal and the required bandwidth to have a video call vary according to the class of a given seat as in the First, Business and Economy Classes in an airplane, the bandwidth cannot be allocated appropriately to each terminal. Thus, according to this embodiment, when a bandwidth is allocated to each video call terminal that is going to start having a video call, a usable bandwidth is allocated according to the resolution of that video call terminal. Specifically, the higher the resolution of a terminal, the broader the bandwidth allocated to that terminal.

For example, suppose a situation where while the video call terminal 105a in the airplane and the terrestrial video call terminal 102 are having a video call, the video call terminal 105b in the airplane has newly logged in the video call software and is going to start using it. In that case, the video call terminal 105b sends information about the screen resolution to the router 101a. On receiving the information, the control section 120 of the router 101a detects the number of terminals per resolution (or class) in Step S705. Then, the control section 120 re-calculates the bandwidth to be allocated to each terminal by the computational formula to be described later and notifies each terminal of that bandwidth information in Step S706. On receiving the bandwidth information re-calculated, the video call terminal 105b sets an image quality according to the bandwidth specified and starts having a video call. On the other hand, the video call terminal 105c changes the image quality according to the bandwidth specified and continues having a video call.

Hereinafter, it will be described with reference to FIGS. 9 through 11 specifically how to allocate the usable bandwidth according to the resolution of the given video call terminal. In the graphs shown in FIGS. 9 to 11, the abscissa represents the time and the ordinate represents the bandwidth.

Figure 9:
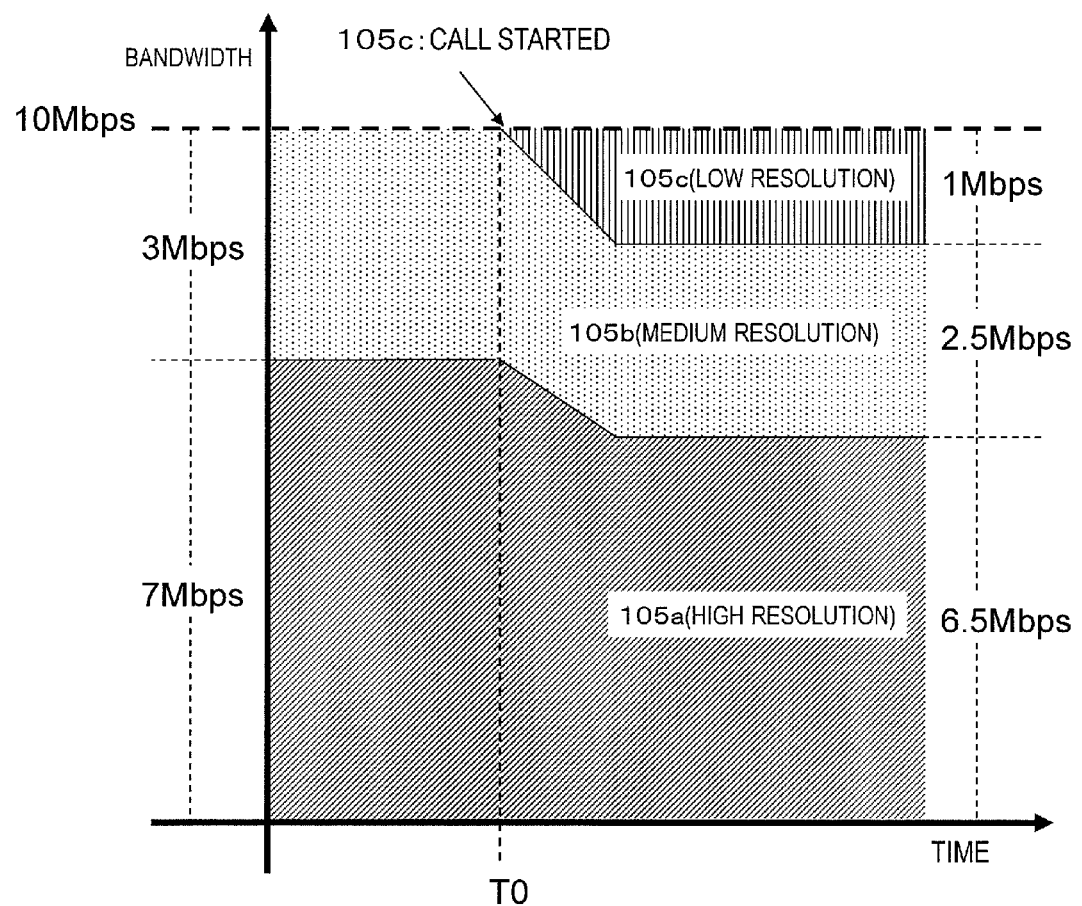
FIG. 9 is a graph showing how the bandwidths allocated to respective video call terminals change with time in a situation where while a high-resolution video call terminal 105a and a medium-resolution video call terminal 105b are having a video call, a low-resolution video call terminal 105c starts having a video call at a time T0.

FIG. 9 is a graph showing an exemplary bandwidth control to be carried out by the router 101a. In this example, in a situation where the usable bandwidth for the overall video call that has been detected by the router 101a with the "bandwidth detecting function" has turned out to be 10 Mbps and where the high-resolution video call terminal 105a and medium-resolution video call terminal 105b have logged in to start having a video call, the low-resolution video call terminal 105c starts having a video call at a time T0. FIG. 9 shows how the usable bandwidths of the respective video call terminals change in such a situation.

By the time T0, the high-resolution video call terminal 105a and medium-resolution video call terminal 105b have already logged in to have a video call and have used bandwidths of 7 Mbps and 3 Mbps, respectively. When the low-resolution video call terminal 105c logs in at the time T0 to start having a video call, the bandwidths are re-allocated according to the resolution-by-resolution numbers of video call terminals by the router 101a with the "function of detecting the number of terminals used per resolution" and the "function of calculating the bandwidth according to the resolution of a given terminal". As a result, the bandwidths allocated to the video call terminals 105a and 105b are changed into 6.5 Mbps and 2.5 Mbps, respectively, and a bandwidth of 1 Mbps is allocated to the video call terminal 105c. Information about the bandwidths allocated to the respective video call terminals is sent from the router 101a to the video call terminals 105a through 105c. In response, the video call terminals 105a through 105c changes the image quality of the video call so as to avoid exceeding the bandwidths allocated to them. In this case, those bandwidths are allocated to the respective video call terminals 105a through 105c according to their resolutions so as to satisfy the relation: video call terminal's (105a) bandwidth> video call terminal's (105b) bandwidth> video call terminal's (105c) bandwidth.

Figure 10:
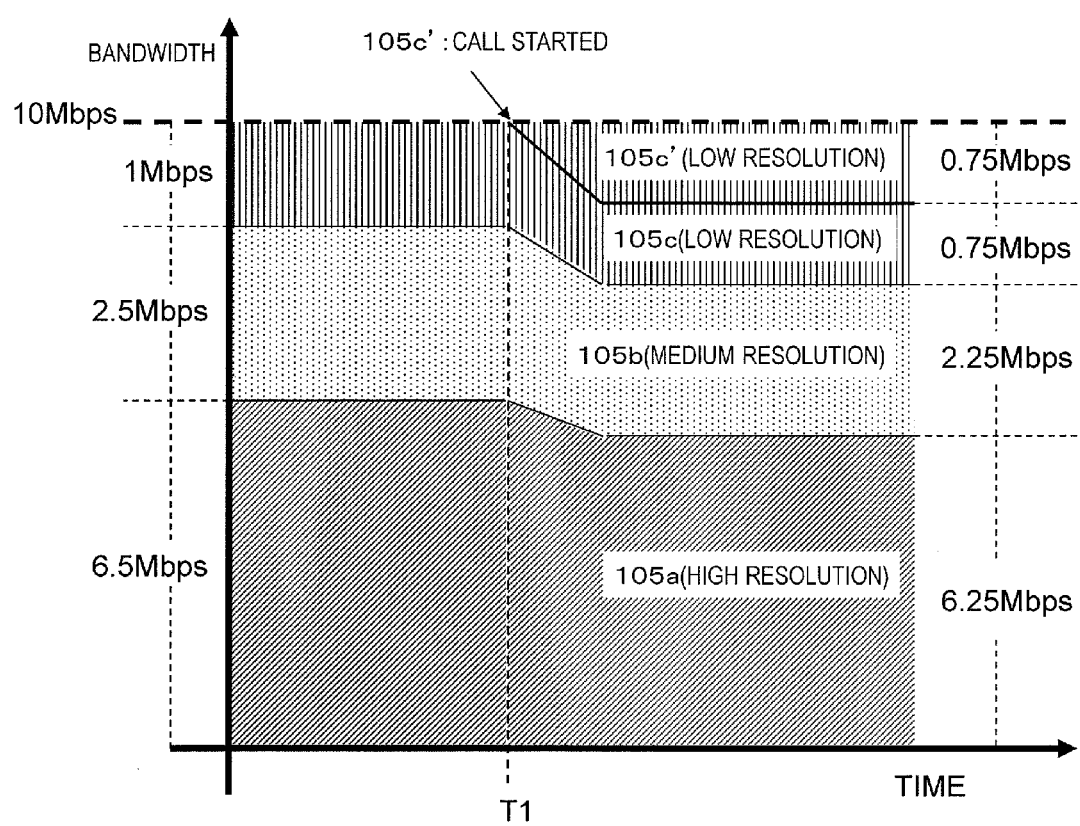
FIG. 10 is a graph showing how the bandwidths allocated to respective video call terminals change with time in a situation where while the high-resolution video call terminal 105a, the medium-resolution video call terminal 105b and the low-resolution video call terminal 105c are having a video call, another low-resolution video call terminal 105c' starts having a video call at a time T1.

FIG. 10 is a graph showing another exemplary bandwidth control to be carried out by the router 101a. In this example, after the number of the terminals that have logged in to have a video call became three at the time T0, another low-resolution video call terminal 105c' logs in at the time T1 to start having a video call. FIG. 10 shows how the usable bandwidths of the respective video call terminals change in such a situation. When the video call terminal 105c' logs in at the time T1 to start having a video call, the bandwidths are re-allocated and the image qualities are changed as in the example shown in FIG. 9. In this case, the bandwidths used by the video call terminals 105c and 105c' that share the same resolution are adjusted to be equal to each other.

FIG. 11 is a graph showing still another exemplary bandwidth control to be carried out by the router 101a. In this example, after the number of the terminals that have logged in to have a video call became four at the time T1, the communication condition has deteriorated due to some change in airflow or the distance from the communications satellite to narrow the usable bandwidth for the overall video call at a time T2. FIG. 11 shows how the usable bandwidths of the respective video call terminals change in such a situation. Once the usable bandwidth for the overall video call has become narrower, the bandwidths are re-allocated to the video call terminals 105a through 105c' so as to avoid exceeding the narrower bandwidth. As in a situation where another terminal newly starts having a video call at the time T0 or T1, the router 101a re-calculates the bandwidths to be allocated to every video call terminal being used and notifies the video call terminals 105a through 105c' of their usable bandwidths. In accordance with the notification, the video call terminals 105a through 105c' control the bandwidths by changing the image qualities of the video call so as not to exceed the usable bandwidths specified.

In the examples illustrated in FIGS. 9 to 11, a situation where another video call terminal has newly logged in and a situation where the overall bandwidth has become narrower have been described. Other than that, however, the bandwidths can also be controlled by performing a similar kind of processing even in a situation where the overall bandwidth has become broader and in a situation where some video call terminal has logged out. In those cases, the usable bandwidth becomes broader for each video call terminal. Optionally, instead of performing such a bandwidth control triggered by some video call terminal's log in on or log out of the video call services, the bandwidth control may also be triggered by a start or end of some video call terminal's video call.

FIG. 12 is a flowchart showing the procedure of the bandwidth control processing described above. Computational formulas to determine the bandwidths to be allocated to respective terminals are also shown in FIG. 12. First of all, in Step S901, the control section 120 of the router 101a determines whether or not the overall usable bandwidth has changed. This decision can be made by checking out the output of the rate measuring device 140 every few seconds and seeing if a bandwidth change exceeding a predetermined threshold value has occurred. In this case, if the decision has been made that the overall bandwidth has not changed, the process advances to Step S902 to determine whether or not there is any terminal that has logged in or logged out. If the answer is NO, the control section 120 carries out the processing step S901 again. On the other hand, if the answer to the query of the processing step S901 or S902 is YES, then the process advances to Step S903 in which the control section 120 performs arithmetic processing based on the following Equations (1) to (3), thereby determining the bandwidths to be allocated to the respective terminals (i.e., performing bandwidth allocation processing):

$$Fb=6\times Wb/(Fn\times 6+Bn\times 3+En\times 1) \quad (1)$$

$$Bb=3\times Wb/(Fn\times 6+Bn\times 3+En\times 1) \quad (2)$$

$$Eb=1\times Wb/(Fn\times 6+Bn\times 3+En\times 1) \quad (3)$$

where Fb, Bb and Eb represent the bandwidths to be allocated to video call terminals of the First, Business and Economy Classes, respectively, Fn, Bn and En represent the numbers of logged-in video call terminals of the First, Business and Economy Classes, respectively, and Wb represents the overall usable bandwidth.

Figure 13:
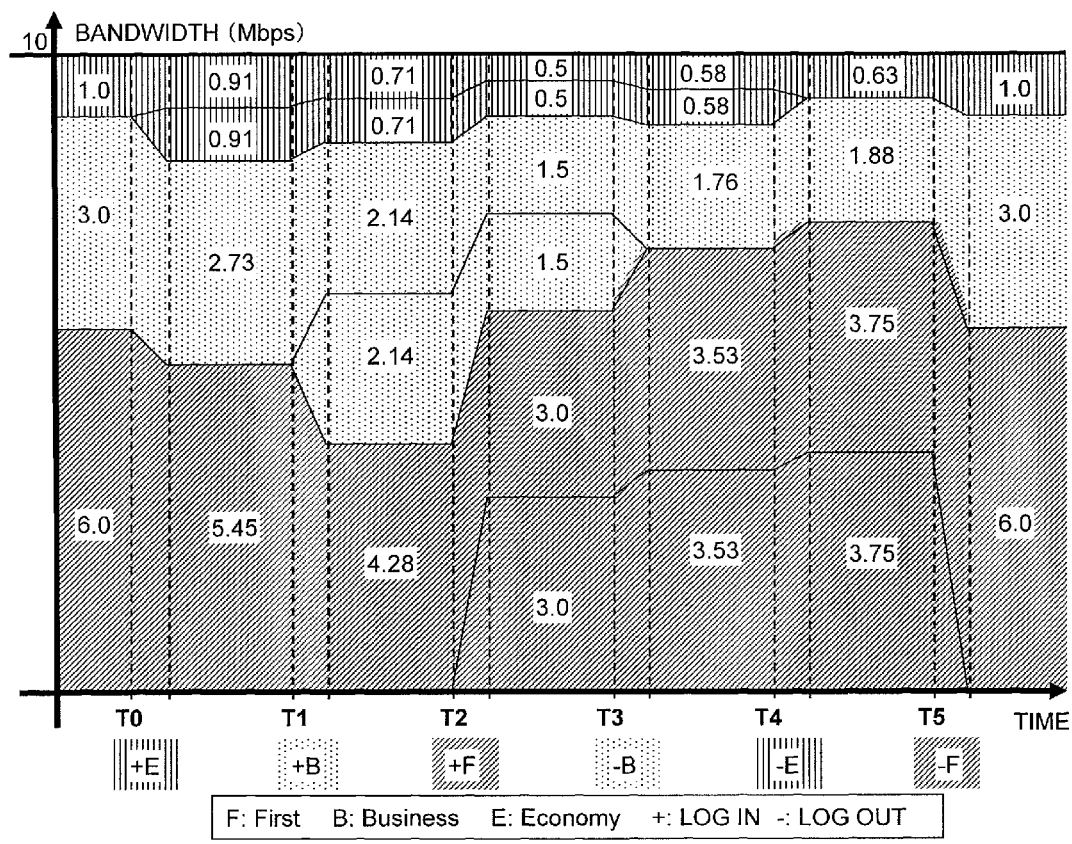
FIG. 13 shows how the bandwidths allocated to respective terminals through the bandwidth control based on the flowchart shown in FIG. 12 change with time.

FIG. 13 is a graph showing how the bandwidths allocated to the respective terminals based on the computational formulas described above change with time in a situation where the overall usable bandwidth is 10 Mbps. Specifically, FIG. 13 illustrates a situation where the video call terminal 105c of the Economy Class logs in at a time T0, the video call terminal 105b of the Business Class logs in at a time T1, the video call terminal 105a of the First Class logs in at a time T2, the video call terminal 105b of the Business Class logs out at a time T3, the video call terminal 105c of the Economy Class logs out at a time T4, and the video call terminal 105a of the First Class logs out at a time T5. As shown in FIG. 13, the bandwidths allocated to the respective terminals are determined so as to satisfy [Fb:Bb:Eb=6:3:1] within the overall bandwidth of 10 Mbps. It should be noted that these computational formulas are just an example and any other computational formulas may be used as long as the control can be performed to satisfy Fb>Bb>Eb.

1-3. Effects

As described above, a router 101a according to this embodiment controls communications between a plurality of video call terminals 105 in an airplane and a video call terminal 102 at a terrestrial site. A selected one of multiple classes is allocated to each of those video call terminals 105 and those multiple classes are associated with respective levels of communication rates. The router 101a includes: an interface (such as a connector terminal for the control section 120) which gets class information indicating what class is allocated to each of those video call terminals 105 and rate information indicating a rate of communication with the video call terminal 102 over a network; and a control section 120 which puts an upper limit on the communication rate of each video call terminal by reference to the class information and the rate information and notify the video call terminal of the upper limit. As a result, the bandwidth control can get done appropriately by reference to the class information and the rate information.

Particularly, the control section 120 puts an upper limit on the communication rate of each video call terminal by performing an arithmetic operation based on a class-by-class number of the video call terminals 105 that are ready to open up communications (i.e., either logged in or online) and on the rate of communication with the terrestrial video call terminal 102 over the network. Specifically, if the rate of communication with the video call terminal 102 over the network has changed, the control section 120 changes the upper limit on the communication rate of each video call terminal. Likewise, if the class-by-class number of the video call terminals 105 that are ready to open up communications (i.e., either logged in or online) has changed, the control section 120 also changes the upper limit on the communication rate of each video call terminal.

By adopting such a configuration, even if the number of terminals that are ready to have a video call has changed or the bandwidth has become broader or narrower due to some change in communication condition while terminals in an airplane and terminals on the ground are having a video call, the bandwidth control can be performed in the best way with the respective resolutions of the video call terminals taken into account. That is why even in a situation where there are multiple grades of seating or multiple different kinds of terminals as in the First, Business and Economy Classes of an airplane, video call services can be provided appropriately according to the classes of the seats and the kinds of the terminals. On top of that, since the bandwidth control of this embodiment can get done just by making the router 101a and the video call terminals 105a through 105c' perform software processing, no dedicated hardware is needed, which is very much cost-effective, too.

Furthermore, on changing the upper limit on the communication rate of each video call terminal 105, the control section 120 notifies the video call terminal 105 of the newly set communication rate. In response to the notification, the video call terminal changes the image quality appropriately, thereby having a video talk without exceeding the bandwidth allocated.

Other Embodiments

Various embodiments have been described as examples of the technique of the present disclosure by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

In the foregoing description of embodiments, it has been described how to perform a bandwidth control when a video call is going on between an airplane and a terrestrial site. However, this method is also applicable to a video call to be carried out between any other combination of sites such as between Terrestrial Sites A and B and between a train and a terrestrial site.

Also, in the embodiments described above, the classes allocated to respective video call terminals are determined based on the resolution. However, the classes may also be determined by any other parameter of use such as the size of a given video call terminal itself or the size of a seat on which the video call terminal is installed or that of any other piece of equipment.

Furthermore, a similar bandwidth control may also be carried out on a carry-on telecommunications device (such as a tablet terminal or a smart phone) that a user carries with him or her, not just an information terminal installed on an airplane or train seat. For example, when registering the terminal of a user who is going to board an airplane or when allowing the user who has sat down on an airplane seat to log in on the video call services provided by the router 101a, the router 101a may determine the seating class of the user of that terminal. In this manner, the bandwidth control of the embodiment described above can also be carried out in the same way on such a carry-on terminal, too.

Furthermore, the class allocated to each information terminal does not have to be fixed but may be variable, too. For example, the control may also be carried out on a single information terminal so that Class A is allocated to that information terminal when the terminal is used by one user but different Class B is allocated to that information terminal when the terminal is used by another user. Still alternatively, when a user uses the information terminal 205, he or she may also be allowed to choose one of multiple classes as a class to allocate. Such a configuration may be adopted for services that present, as pay options, multiple classes that provide communication rates varying with the service charge paid. According to such services, only to a user that has picked up one of those pay options, a class that provides a communication rate associated with the service charge paid is allocated. In that case, even if the same information terminal is used, the class may vary according to the user's preference. In this manner, the class allocated to each information terminal just needs to be fixed at a certain point in time during communications. And it is not that a class that has been determined once should be maintained after that.

Furthermore, the technique of the present disclosure is also applicable to a software program that defines the processing described above. Such a program may define an operation such as the one shown in FIG. 8 or 12, for example. And such a program may be either distributed by being stored on a removable storage medium or downloaded over telecommunications lines. By making a processor built in a computer execute such a program, various operations that have been described for the embodiments of the present disclosure can get done.

The communications system of the present disclosure can be used to carry out communications between various combinations of sites such as between two airplanes, between a train and a terrestrial site, and between two terrestrial sites, as mentioned above.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-136607 filed Jun. 18, 2012 and No. 2013-096191 filed May 1, 2013, the entire contents of which are hereby incorporated by reference.

What is claimed is:

1. A control device that controls communications between a plurality of information terminals at a first site and an information device at a second site, wherein a selected one of multiple classes is allocated to each of the plurality of information terminals and those multiple classes are associated with respective levels of communication rates, the control device comprising:
   an interface configured to obtain class information indicating what class is allocated to each of those information terminals and also obtain rate information indicating a rate of communication with the information device over a network; and
   a control section configured to set an upper limit on the communication rate of each said information terminal by reference to the class information and the rate information and notify each said information terminal of the upper limit.

2. The control device of claim 1, wherein the control section is configured to set an upper limit on the communication rate of each said information terminal by performing an arithmetic operation based on a class-by-class number of the information terminals that are ready to open up communications and on the rate of communication with the information device over the network.

3. The control device of claim 1, wherein the plurality of information terminals is configured to allow the user to have a video call.

4. The control device of claim 3, wherein the class allocated to each said information terminal is determined by the screen resolution or size of the information terminal.

5. The control device of claim 1, wherein each of the plurality of information terminals is installed on an associated one of a plurality of seats that are arranged at the first site.

6. The control device of claim 5, wherein the class allocated to each said information terminal is determined by the kind of the seat on which the information terminal is installed.

7. The control device of claim 1, wherein the control section is configured to change the upper limit on the communication rate of each said information terminal when the rate of communication with the information device over the network has changed.

8. The control device of claim 1, wherein the control section is configured to change the upper limit on the communication rate of each said information terminal when the class-by-class number of the information terminals that are ready to open up communications has changed.

9. The control device of claim 1, further comprising a router that relays data to be transmitted between the plurality of information terminals and the information device.

10. The control device of claim 1, wherein the plurality of information terminals and the router are installed in an airplane.

11. The control device of claim 1, wherein a selected one of at least three classes is allocated to each of the plurality of information terminals.

12. The control device of claim 1, further comprising a rate measuring device configured to measure the rate of communication with the information device over the network and output the rate information.

13. The control device of claim 1, further comprising a storage medium that stores the class information.

14. A communications system that relays information to be transmitted between a plurality of information terminals at a first site and an information device at a second site, wherein a selected one of multiple classes is allocated to each of the plurality of information terminals and those multiple classes are associated with respective levels of communication rates, the system comprising:
   a router configured to relay information to be transmitted between the plurality of information terminals and the information device;
   a storage medium configured to store class information indicating what class is allocated to each of the plurality of information terminals;
   a rate measuring device configured to measure the rate of communication between the router and the information device over a network and output rate information; and
   a control device configured to set an upper limit on the communication rate of each said information terminal by reference to the class information and the rate information and notify each said information terminal of the upper limit.

15. The communications system of claim 14, further comprising the plurality of information terminals.

16. The communications system of claim 14, further comprising a wireless antenna that is electrically connected to the router and that is configured to make communications with a communications satellite.

17. A computer program, stored on anon-transitory computer-readable storage medium, to be used in a communications system that relays information to be transmitted between a plurality of information terminals at a first site and an information device at a second site, wherein a selected one of multiple classes is allocated to each of the plurality of information terminals and those multiple classes are associated with respective levels of communication rates, the program causing a computer in the communications system perform the steps of:

obtaining class information indicating what class is allocated to each of the plurality of information terminals and rate information indicating the rate of communication with the information device over a network;

putting an upper limit on the communication rate of each said information terminal by reference to the class information and the rate information; and notifying each said information terminal of the upper limit on the communication rate.

* * * * *